2,853,505
HALOGEN SUBSTITUTED ALKENYL XANTHATES

Marion W. Harman, Nitro, W. Va., assignor to Monsanto Chemical Company, St. Louis, Mo., a corporation of Delaware No Drawing. Application October 17, 1957
Serial No. 690,626

8 Claims. (Cl. 260—455)

The present invention relates to new compositions of matter of the broad chemical class most readily described as halogen substituted alkenyl xanthates. More specifically, the invention is directed to compounds of the type containing one to four

radicals linked to oxygen or nitrogen, at least one being linked to oxygen, which oxygen is further linked to a lower alkylene group. The remaining valence of the alkylene group is linked to an organic radical containing at least one of the elements sulfur, oxygen and nitrogen in single bond linkages. In other words, these elements are exclusive of other

radicals which may be present and exclude carbonyl, thiocarbonyl and amido groups and amidines. Preferably, the alkylene radical is linked directly to sulfur, oxygen or nitrogen. Y represents a halogen substituted lower alkenyl radical containing one double bond having halogen linked to unsaturated carbon.

The new compounds comprise a class of oil soluble materials which are useful adjuvants for the compounding of mineral lubricating oils. They are liquids readily soluble in mineral oil fractions which increase the load carrying capacity of mineral lubricating oils. In addition, the dihalogen substituted phenoxyethyl xanthates and the hydroxyethoxyethyl xanthates are useful for destroying undesired vegetation. Increasing the number of halogen atoms in the phenoxyethyl group lowers the toxicity to plant life and lowers solubility in mineral oil but the presence of one or two halogen atoms in the phenyl group is essential for herbicidal activity.

The xanthate desired for reaction with the haloalkene is produced in the ordinary manner by reacting in a jacketed vessel equipped with agitation an alcohol, carbon disulfide and an alkali, such as caustic soda or potash. The reaction is carried out at room temperature and the product formed is dissolved in water. Should any water insoluble product be present, it is removed by filtration through paper, clay or by extraction with a solvent such as benzene. Where the alcohol is an amino substituted alcohol containing replaceable hydrogen on the amino group, the proportion of carbon disulfide should be sufficient to combine with the amine as well as the alcohol moiety.

The solution of the xanthate together with about 0.1% its weight of a suitable wetting agent, such as decyl benzene sodium sulfonate, is then placed in a jacketed container, through which jacket may be circulated suitable heating or cooling means as desired or required. The container is equipped with an agitator, a reflux condenser and suitable temperature recording means. Thereupon a quantity of halogen substituted alkenyl halide substantially equivalent in amount to the number of —CS.SM groups in the xanthate, M representing sodium or potassium, was added as rapidly as possible and the mixture stirred for from 8–24 hours. If the temperature of the mass rises excessively it may be controlled by flowing water through the jacket. At the end of the reaction, the heavy oil product is extracted by solvent means, such as ether, chloroform, benzene or heptane, then the extract washed with water until neutral, the solvent is removed by heat, preferably under a vacuum of 4 to 10 mm. mercury and heated to 95–100° C. The halogen substituted alkenyl xanthates are oils, of a pale yellow to amber color, particularly after standing for a few hours, are insoluble or only very slightly soluble in water and are very soluble in ether, acetone, alcohol, ethyl acetate, chloroform, heptane and benzene.

Proceeding as described above, a large number of haloalkenyl xanthates within the class as shown and as hereinafter claimed have been prepared. A few of such compounds are shown below in tabular form:

3-chloro-2-butenyl tetrahydrofurfurylxanthate

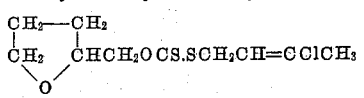

3-chloro-2-butenyl 2-(2-hydroxyethoxy)ethylxanthate

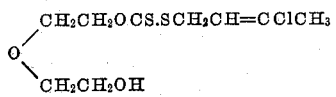

Tris-(3-chloro-2-butenyl)-2,2',2"-nitrilotris-(ethylxanthate)

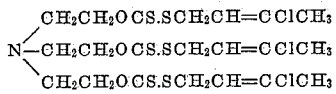

N-(3-chloro-2-butenyldithiocarbamyl)-N,N-bis(3-chloro-2-butenyl ethylxanthate)

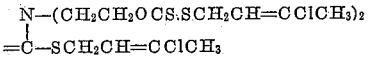

3-chloro-2-butenyl N,N-diethylaminoethylxanthate

3-chloro-2-butenyl 2-(4-morpholinyl)ethylxanthate

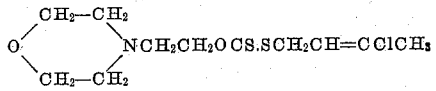

N,N'-ethylene bis[(3-chloro-2-butenyl dithiocarbamyl)-2,2'-(3-chloro-2-butenyl)ethylxanthate]

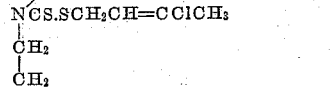
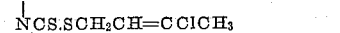

2-chloroally t-butylthioethylxanthate

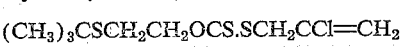

2-chloroallyl 2-(2,4-dichlorophenoxy)ethylxanthate

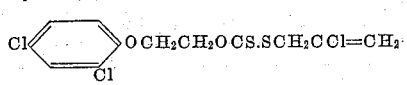

2-chloroallyl 2-(phenylthio)ethylxanthate

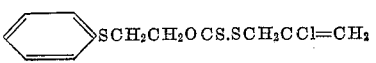

2-chloroallyl N-(N-methylanilino) ethylxanthate

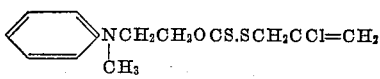

2-chloroallyl 2-(2-propanethio)ethylxanthate $(CH_3)_2CHSCH_2CH_2OCS.SCH_2CCl{=}CH_2$ 2-chloroallyl 2-ethoxyethylxanthate $C_2H_5OC_2H_4OCS.SCH_2CCl{=}CH_2$ 2-chloroallyl 2-(2-hydroxyethoxy)ethylxanthate $HOC_2H_4OC_2H_4OCS.SCH_2CCl{=}CH_2$ Tris-(2-chloroallyl)-2,2′,2″-nitrilotris(ethylxanthate)

$N(C_2H_4OCS.SCH_2CCl{=}CH_2)_3$ 2-chloroallyl N,N-diethylaminoethylxanthate $(C_2H_5)_2NC_2H_4OCS.SCH_2CCl{=}CH_2$ 2-chloroallyl 2-(4-morpholinyl)ethylxanthate

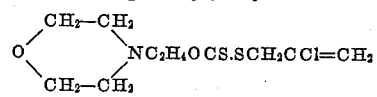

2,3-dichloroallyl 2-ethoxyethylxanthate $C_2H_5OC_2H_4OCS.SCH_2CCl{=}CHCl$ 2,3-dibromoallyl 2-ethoxyethylxanthate $C_2H_5OC_2H_4OCS.SCH_2CBr{=}CHBr$ 3-iodoallyl 2-butoxyethylxanthate $C_4H_9OC_2H_4OCS.SCH_2CH{=}CHI$ 2-chloro-3-fluoroallyl 2-tert. butylthioethylxanthate $(CH_3)_3CSC_2H_4OCS.SCH_2CCl{=}CHF$ 2,3-dichloro-2-butenyl 2-isopropoxyethylxanthate $(CH_3)_2CHOC_2H_4OCS.SCH_2CCl{=}CClCH_3$ The amounts of halogen substituted alkenyl xanthates to be added to the lubricating stock to impart extreme pressure lubricating properties thereto will vary somewhat depending upon the particular xanthate and the objects desired but in general varies between about 1% and about 10% of the oil base by weight. Since the compounds are fully soluble in lubricating oils, a wide range of homogeneous compositions can be prepared. Thus, concentrates containing relatively large amounts, as for example 50%, of the xanthate can be prepared for storage and shipment and diluted to the desired concentration before actual use.

As noted, the dihalogen substituted phenoxyethylxanthates and hydroxyethoxyethylxanthates are also effective for destroying undesired vegetation. This property may be demonstrated by applying the xanthate in spray form to 10 to 14 day old specimens of grass and to a mixture of various species of broadleaf plants and observing the phytotoxicity. In the table below 2 indicates moderate toxicity, 3 severe toxicity and 4 indicates the plants are dead.

Table I

| Toxicant | Conc., Percent | Phytotoxicity | |
|---|---|---|---|
| | | Corn | Mixed Broadleaf |
| 2-Chloroallyl 2-(2,4-dichloro-phenoxy) ethylxanthate | 0.5 | 2 | 3+ |
| | 0.2 | 2+ | 2+ |
| 3-Chloro-2-butenyl 2-(2-hydroxy-ethoxy) ethylxanthate | 1.0 | 1+ | 4 |
| | 0.3 | 1 | 3 |

It is intended to cover all changes and modifications of the examples of the invention herein chosen for purposes of disclosure which do not constitute departures from the spirit and scope of the invention.

This application is a continuation-in-part of application Serial No. 516,050, filed June 16, 1955, and now abandoned.

What is claimed is:

1. A halogen substituted alkenyl xanthate comprising a compound containing one to four $$-\overset{\overset{S}{\|}}{C}-S-Y$$

radicals linked to a member of the group consisting of oxygen and nitrogen at least one being linked to oxygen which oxygen is further linked to a lower alkylene group, the other valence of which is linked to an organic radical containing in single bond linkages at least one of the elements selected from the group consisting of sulfur, oxygen and nitrogen exclusive of sulfur in a $$-\overset{\overset{S}{\|}}{C}-S-$$

radical, Y representing a halogen substituted lower alkenyl radical containing one double bond having halogen attached to unsaturated carbon.

2. A halogen substituted alkenyl xanthate of the general formula $$(Y\overset{\overset{S}{\|}}{SC}-)_{3-n}N(C_2H_4O\overset{\overset{S}{\|}}{C}-S-Y)_n$$

where $n$ is an integer from 1 to 3 and Y represents a halogen substituted lower alkenyl radical containing one double bond having halogen attached to unsaturated carbon.

3. A halogen substituted alkenyl xanthate of the general formula $$\overset{R}{\underset{R'}{{\Large >}}}NC_2H_4O\overset{\overset{S}{\|}}{C}-S-Y$$

where R and R′ represent lower alkyl radicals and Y represents a halogen substituted lower alkenyl radical containing one double bond having halogen attached to unsaturated carbon.

4. A halogen substituted alkenyl xanthate of the general formula $$R-X-C_2H_4O\overset{\overset{S}{\|}}{C}-S-Y$$

where R represents a hydrocarbon radical, X is a chalkogen having atomic weight less than 40 and Y represents a halogen substituted lower alkenyl radical containing one double bond having halogen attached to unsaturated carbon.

5. A halogen substituted alkenyl xanthate of the general formula $$R-X-C_2H_4-O-\overset{\overset{S}{\|}}{C}-S-Y$$

where R represents a lower alkyl group, X is a chalkogen having atomic weight less than 40 and Y represents a halogen substituted lower alkenyl radical containing one double bond having halogen attached to unsaturated carbon.

6. 3-chloro-2-butenyl 2-(2-hydroxyethoxy)ethylxanthate.

7. 2-chloroallyl 2-(2,4-dichlorophenoxy)ethylxanthate.

8. Tris-(3-chloro-2-butenyl)-2,2′,2″-nitrilotris-(ethylxanthate).

No references cited.